United States Patent [19]

Fleming

[11] Patent Number: 5,647,484

[45] Date of Patent: Jul. 15, 1997

[54] LAPTOP COMPUTER ENCASEMENT DEVICE ADAPTED FOR PRINTER

[76] Inventor: Daniel J. Fleming, 224 Belvidere Ave., Washington, N.J. 07882

[21] Appl. No.: 658,854

[22] Filed: May 31, 1996

[51] Int. Cl.⁶ .................................................. B65D 85/38
[52] U.S. Cl. ........................ 206/576; 190/109; 206/305; 206/320
[58] Field of Search ................................ 206/305, 320, 206/576; 190/109–111

[56] References Cited

U.S. PATENT DOCUMENTS

| | | | |
|---|---|---|---|
| 4,790,431 | 12/1988 | Reel et al. | 190/109 |
| 4,837,590 | 6/1989 | Sprague | 206/305 |
| 4,839,837 | 6/1989 | Chang . | |
| 4,840,258 | 6/1989 | Tomikawa et al. | 190/111 |
| 4,896,776 | 1/1990 | Kabanuk et al. | 206/305 |
| 5,115,374 | 5/1992 | Hongoh . | |
| 5,214,574 | 5/1993 | Chang | 206/305 |
| 5,226,540 | 7/1993 | Bradbury | 206/320 |
| 5,242,056 | 9/1993 | Zia et al. . | |
| 5,345,403 | 9/1994 | Ogawa et al. . | |
| 5,364,196 | 11/1994 | Baitz et al. . | |
| 5,437,367 | 8/1995 | Martin | 206/320 |
| 5,445,266 | 8/1995 | Prete et al. | 206/305 |
| 5,485,922 | 1/1996 | Butcher . | |
| 5,494,447 | 2/1996 | Zaidan . | |

*Primary Examiner*—Jimmy G. Foster
*Attorney, Agent, or Firm*—Kenneth P. Glynn, Esq.

[57] ABSTRACT

An encasement device for a portable computer and other associated peripheral devices, which when opened represents an organized, and ready-to-use standalone workstation. It includes a top box-type structure and a bottom box-type structure both having a front, a back, a pair of side walls and cover or bottom, respectively. The top box-type structure is hingedly connected and securable to the bottom box-type structure. A droppable front is provided for easy access to the keyboard of the portable computer and has a wrist pad. Alternatively, the case is provided with a contoured structure for easy access. The portable computer is removeably attached to the bottom box-type structure such that access is available to side-orientated internal devices. An electrical containment section is provided to hold connectors, an outlet cord, surge protectors and power conditioners. A foldable staging area is provided to removeably hold a peripheral device. The foldable staging area is positioned such that when the encasement device is open, the foldable staging area has adequate clearance for the display screen of the portable computer and can also fit within the top box-type structure when said encasement device is closed. It further includes ports for external devices such as modems and facsimile devices.

20 Claims, 3 Drawing Sheets

LAPTOP COMPUTER ENCASEMENT DEVICE ADAPTED FOR PRINTER

BACKGROUND OF THE INVENTION

1. Field of the Invention

The present invention relates in general to cases for the transportation and storage of laptop computers, associated peripherals and other materials. Specifically, the present invention provides a case which can carry the laptop computer and the printer in a pre-connected operating state. More specifically, the device provides a foldable staging area for the placement of the peripheral device.

2. Description of the Prior Art

The following patents describe devices which attempt to provide cases for transporting laptop computers and or other devices which have both a laptop and a printer.

U.S. Pat. No. 5,485,922 to Butcher depicts a portable computer carrying device. It has a main housing, which is divided into a top and bottom compartment. The top compartment has various support members which receive and maintain the position of the portable computer. A surge protector/suppressor is provided in the top compartment and is exteriorly accessible through a power cord outlet placed in one of the walls of the case. An access panel also exists to connect the top and bottom compartments. The bottom compartment has a main access panel and holds a portable computer printer and other accessories.

U.S. Pat. No. 5,494,447 to Zaidan describes a hinge assembly for electronic devices having two or more device parts that interconnect and provides stable support to such a structure. An electrical connector is included in each joint to pass electrical signals regardless of rotational position.

U.S. Pat. No. 5,242,056 to Zia et al., describes a portable office carrying case for carrying electronic equipment, such as portable computers. The front ridged side is hinged to the base and detachable from the sides to provide access to the keyboard. A storage folder is provided for on the outside of the case. Pockets may be mounted inside the case to hold various office supplies.

U.S. Pat. No. 5,345,403 to Ogawa et al., describes an information processing apparatus and printer used for the same. A processor-keyboard base section has a detachable printer section. The information processing apparatus is provided with a liquid crystal display, which is rotatably openable/closable. A printer is attached behind the liquid crystal display.

U.S. Pat. No. 5,115,374 to Hongoh describes a portable computer including, for facsimile transmission, a document scanner integral with the display module. A laptop computer has an internal modem and facsimile adapter in its main body and a member hingeable connected to the base, which on one side is a screen and on the other side is the paper path for the integral scanner.

U.S. Pat. No. 4,839,837 to Chang describes a three layered laptop computer. A portable computer assembly includes a keyboard section pivotly attached to an output member (i.e they are positioned co-planarly) and hingedly connected to a display unit (i.e the display unit is vertically positioned with respect to the other parts).

Notwithstanding the above prior art, it is believed that the device and method set forth herein is neither taught nor rendered obvious.

SUMMARY AND OBJECTS OF THE INVENTION

The present invention is an encasement device for a laptop computer and associated peripheral devices. In this context, the laptop computer is meant to refer to that genre of devices known as portable computers. As shown above, present encasement devices do not have the ability to provide a systematic and organized method for having a laptop computer and a peripheral device, namely a printer, in a pre-connected, ready-to-use state. The present invention provides an aesthetically pleasing and easy to use encasement device which serves the multiple purposes of transporting the enclosed devices, protecting the enclosed devices and provides a standalone, portable office. Furthermore, it can be used in places where desks are not easily available and where workspace is limited. Finally, the encasement device provides an ergonomically correct positioning of the laptop (with wrist pads for added safety), printer and other peripheral devices.

The encasement device is ideal for busy executives who are always in transit, college students who may be studying in areas with limited workspace (i.e. study halls and the library) and even for people who use it at home. In all of the above cases, the present invention provides easy access to all pertinent files, has a hooked up printer and if the lines are available, it can be connected to the Internet. In addition, the encasement device is easy to store and provides all the necessary protection required by the internal components.

The present invention accomplishes the above functionality and corrects the defects of past devices by providing a top and bottom box-type structure, which are hingeably connected in the manner of a suitcase. In the preferred embodiment, the outside of the top box-type structure has a handle and two clasps for closing the encasement device. The bottom box-type structure has a corresponding set of clasp holders to complete the encasement device's closing mechanism.

The bottom box-type structure has a hingeably connected front, which folds down to provide easy access to the laptop computer when the encasement device is opened. Alternatively, a snap tight feature is available to provide better security and support. The laptop computer is placed and removeably attached to the bottom box-type structure. Space is provided in the case to allow the user to orient the laptop computer so that a side access CD-ROM drive can be accommodated. Access ports are also provided in alternative embodiments to connect the laptop computer to external computer equipment, such as monitors, mouses, facsimile and modem devices and to the Internet.

In an alternative embodiment, the top and bottom box-type structures have contoured sidewalls and fronts which provide ergonomically correct access to the laptop. Specifically, the sidewalls of the top box-type structure have partial extension portions and the front has an extended lip portion. The bottom box-type portion has a complementary structure, i.e. a matching portion of the sidewalls have decreased height. In addition, the height of the front is equivalent to the height of the sidewalls. In a closed state, the encasement device will look like the other embodiments since all sections will fit accordingly. The bottom of the bottom box-type structure is constructed such that the keyboard of the laptop is at the same height as the front portion.

A foldable staging area is provided for easy access to peripheral devices, specifically a printer. The foldable staging area is hingeably connected to the inside of the encasement device. It is positioned such that when the encasement device is open, the screen of the laptop computer can be opened underneath the foldable staging area. Furthermore, the foldable staging area is constructed such that the peripheral device can be removeably attached to the foldable staging area and still fit within the top box-type structure when the encasement device is closed.

To preserve the systematic and organized appearance of the encasement device, a section is provided which holds all electrical devices and wiring. In addition, an accordion type folder is provided for holding paper, envelopes, diskettes and any other such supplies. The concept ultimately being to provide a standalone office which is ready-to-use upon opening.

BRIEF DESCRIPTION OF THE DRAWINGS

The present invention should be more fully understood when the specification herein is taken in conjunction with the drawings appended thereto, wherein.

DETAILED DESCRIPTION OF THE PRESENT INVENTION

The present invention is an encasement device for a laptop computer and associated peripheral devices, specifically a printer. The encasement device of the present invention provides an efficient and organized method of holding a laptop computer and a printer in a pre-connected, operable state. The term laptop computer is meant to cover any computer devices which are referred to as portable computers.

The device features an easy access to keyboard feature, a foldable staging area and an electrical connection section. Access to the keyboard is accomplished via either a droppable front or by contouring the two box-type structures. In the droppable front embodiment, wrist pads may be provided. The device provides a section for holding all electrical and other connectors in a closed off area, such that when using it in front of clients, it provides the appearance of an easy and organized workstation. In addition, it provides a foldable staging area for the placement of peripheral device, namely a printer. In other words, when the user opens up the encasement device, the laptop and printer are already connected together and are in a ready-to-use state, and all wires and connections are located in a sealed off area.

As a result, the encasement device provides an ergonomically designed portable workstation, which has easy and same level access to the keyboard and has an easily usable printer station.

Figure 1:
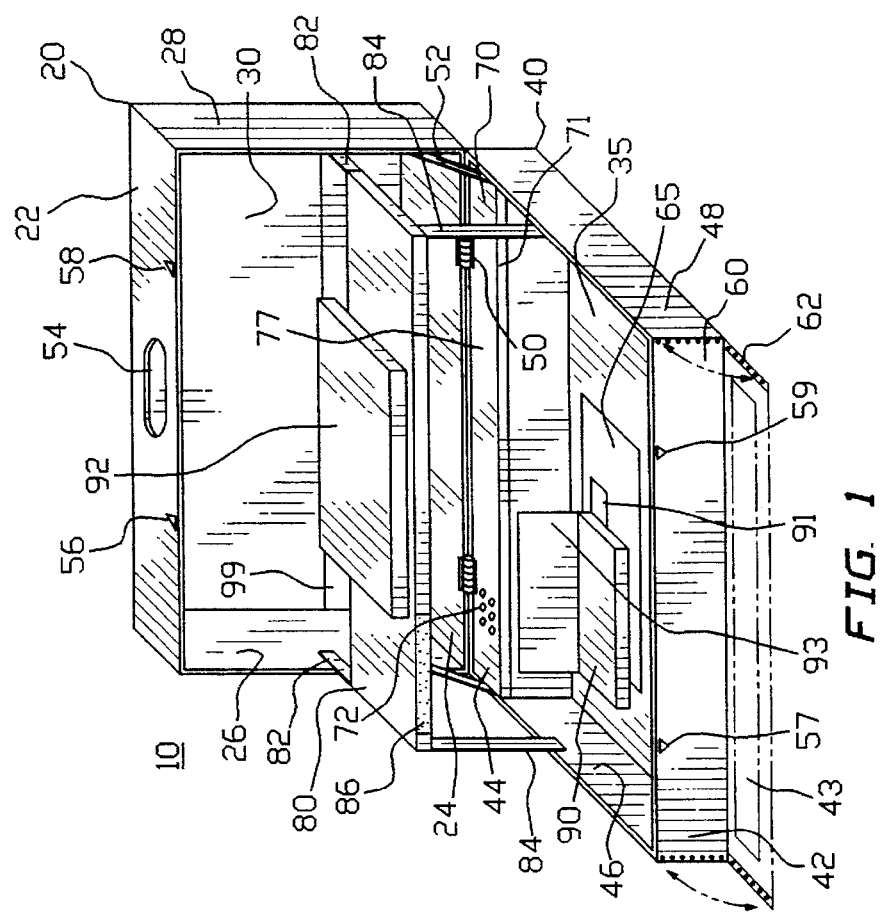
FIG. 1 shows a perspective view of a preferred embodiment of the present invention.

Referring to FIG. 1, the present invention is a laptop encasement device with staging area and is generally depicted as 10. Device 10 has a top box-type structure 20 and a bottom box top structure 40. Top box-type structure 20 and bottom box type structure 40 can be constructed from a range of materials, including hard plastics, brushed aluminum, woods, polymers, wood with leather covering and metals. Top box-type structure 20 and bottom box-type structure 40 are connected via a hinge 50 and may have a secondary support hinge structure 52.

Top box-type structure 20 has a top-front 22, top-back 24, a pair of top-sides 26, 28 and a cover 30. Bottom box-type structure 40 has a front 42, sides 46, 48 and bottom 35. Top-front 20 has a handle 54 for carrying device 10 and a set of clasps 56, 58 which correspond to complementary clasp holders 57, 59, positioned on front 42 to match clasps 56, 58. Clasps 56, 58 and clasp holders 57, 59 are used to keep device 10 closed and locked when device 10 is in transport or storage.

As mentioned above, device 10 is meant to be easily and comfortably used by the user. One way of accomplishing this is to have front 42 hingeably connected to sides 46, 48. Front 42 can be connected to sides 46, 48 by any of a variety of methods. In one embodiment, a continuous, flexible material or plastic hinge-type structure 60 can be used which folds down when device 10 is opened. A snap-tight feature 62 could also be used which would provide additional support and prevent front 42 from opening when not desired. Front 62 can also have wrist padding 43.

In a preferred embodiment, laptop computer 90 is positioned in bottom box-type structure 40. Laptop computer 90 is removeably attached to bottom 35 via removable attachment mechanisms 65, 66. These include filamentary loop and hook mechanisms, commonly known as "velcro." Removable attachment component 66 is attached by the user to laptop computer 90. Complementary removable attachment component 65 is centrally located on bottom 35 to accommodate laptop computer 90, which may have a side-access CD-ROM drive 91 and also allows for additional peripherals, such as a PCMCIA Type II card, which is used for multimedia applications.

As mentioned above, it is always desirable to appear organized and efficient in front of the customer. One way is to have all the wiring and associated connections done prior to using the laptop in front of the customer. As such, bottom box-type structure 40 has an electrical connection section 70. Electrical connection section 70 is adapted to hold all necessary electrical components in a pre-wired, ready state. This includes all necessary DC converters, a surge protector/suppressor and an outlet plug. The outlet plug may be of the retractable-type and can be accessed either through an optional access port (not shown) or the outlet cord section can be pulled out from inside electrical connection section 70 using hinged lid 77. Lid 77 can be closed using filamentary loop and hook mechanisms. When necessary the outlet cord can be plugged into any external power outlet to power laptop computer 90 and printer 93. Rubber seal 71 allows passage of all the necessary wiring and connectors to and from electrical connection section 70 and associated computer devices, laptop computer 90 and printer 92. Ventilation holes 72 are provided to allow for thermal dissipation.

In addition to pre-connecting all equipment, it is desirable to have all equipment in a ready and easy to use, organized state. As shown before, laptop computer 90 is accessible upon opening device 10. Printer 92 is also as easily accessible due to foldable staging area 80. Printer 92 is attached to foldable staging area 80 in the same manner as laptop computer 90.

Foldable staging area is hingeably connected to the internal structure of device 10. In the present embodiment, foldable staging area 90 is hingeably connected to top box-type structure 20 via top connectors 82 and to bottom box-type structure 40 via bottom connectors 84. Foldable staging area 80 is positioned such that a screen 93 of laptop computer 90 is openable underneath foldable staging area 80. When the encasement device is closed, foldable staging area 80, with attached printer 92, fits inside of top box-type structure 20. To provide more storage space, a shelf 86 is located underneath foldable staging area 80. Shelf 86 is designed to hold envelopes, paper and other such devices.

Device 10 is also provided with padding 95 to prevent damage to laptop computer 90 and printer 92. Padding 95 is positioned on a bottom side 96 (not shown) of shelf 86 and on internal side 97 (not shown) of top-front 22. Padding 95 helps prevent damage and places additional pressure on laptop 90 and printer 92 to keep them in place during transport.

Device 10 is further provided with a folder 99 on internal side 31 of cover 30. Folder 99 can be an accordion-type folder and can hold diskettes, paper, pencils, pens and other office materials.

Figure 2:
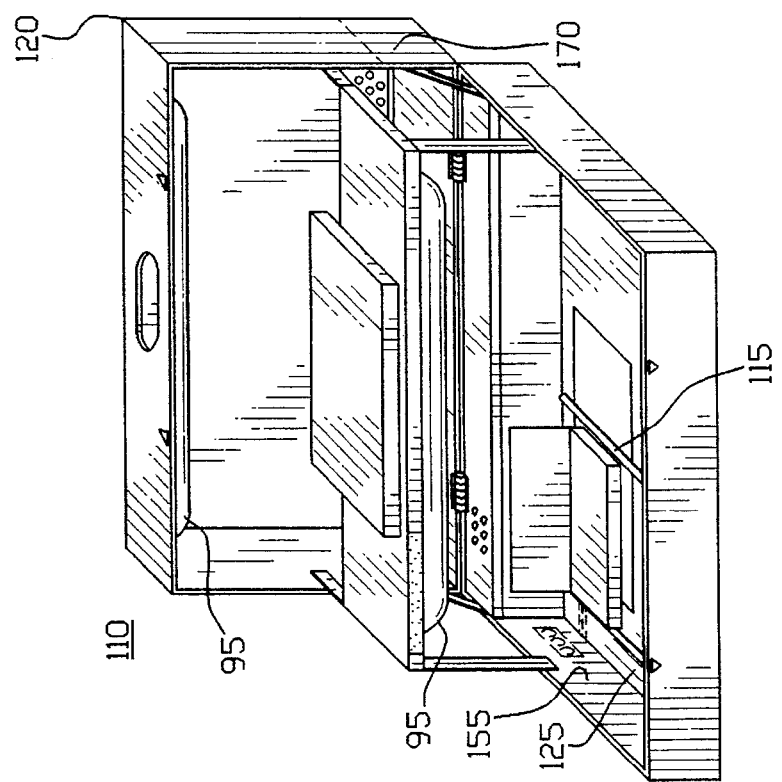
FIG. 2 shows an alternate embodiment of the present invention.

Referring now to FIG. 2, an alternative embodiment of the present invention is shown and is depicted generally as 110. All features identified previously will have identical reference numbers. This embodiment functions generally as the previous and only the additional features are detailed.

In this embodiment, electrical connection section 170 is positioned in top box-type structure 120. Electrical connection section 170 performs the same functions as before and is similarly constructed. Folder 199 is still provided, but is sized to accommodate electrical connection section 170.

Device 110 further depicts optional stabilizer or support bars 115, sub-shelf 125, and access ports 145. Stabilizer bars 115 provide additional support for laptop computer 90 and prevents lateral movement. It is a removeably attached structure and is connected via removable attachment mechanisms, including filamentary loop and hook mechanisms, commonly known as "velcro". Sub-shelf 125 and access ports 145 provide organized and efficient methods for hooking up other computer peripherals, such as an external mouse, keyboard and monitor (for using the encased laptop computer 90 as a server); a plurality of serial and parallel ports, facsimile and modem devices (connected via RJ11 ports) and a network port (via a RJ45 port). Underneath sub-shelf 125, which is also connected via removable attachment mechanisms, lie the connectors for the various peripherals mentioned. This maintains the clean and organized appearance of the encasement device. Access ports 145 would be positioned on either side 146 or 148 and would be closeable/openable from the outside via a slidable or hingeable cover 155. Alternative methods could also be used to cover access ports 145 including circular-hinged covers. Hingeable cover 155 would preferably be constructed from the same material as device 110 to maintain the exterior appearance.

Figure 3:
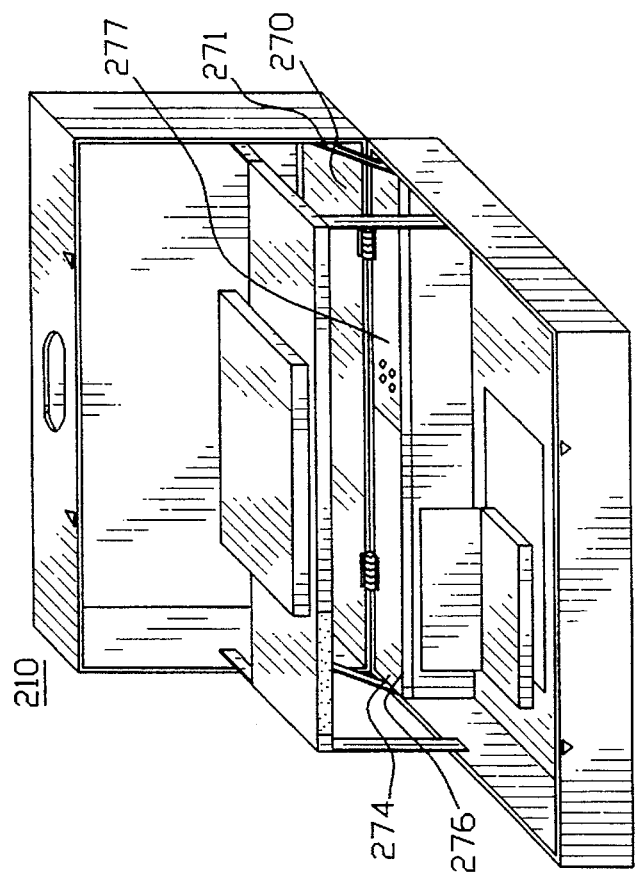
FIG. 3 shows yet another embodiment of the present invention.

Referring to FIG. 3, another embodiment is shown of the present device and is depicted generally as 210. Again all features previously mentioned will have similar references. Those items that were not previously mentioned or are different are emphasized. Device 210 has the additional feature of 2 electrical connection sections 270, 273 with hingeable lids 276, 277, respectively. Each electrical connection section 270, 273 occupies half the area occupied by electrical connection section 70. This design unclutters the contents of both electrical connection sections 270, 273 by spreading out the contents of electrical connection section 70 (i.e. the DC converter). Moreover, the remaining space is occupied by utility storage areas 274 and 275 (not shown). Utility storage areas 274, 275 also have hingeable lids 278 and 279 (not shown) which provide easy access to the compartment. This area can be used to hold various items including batteries, cards for other peripheral devices and other such items.

Figure 4:
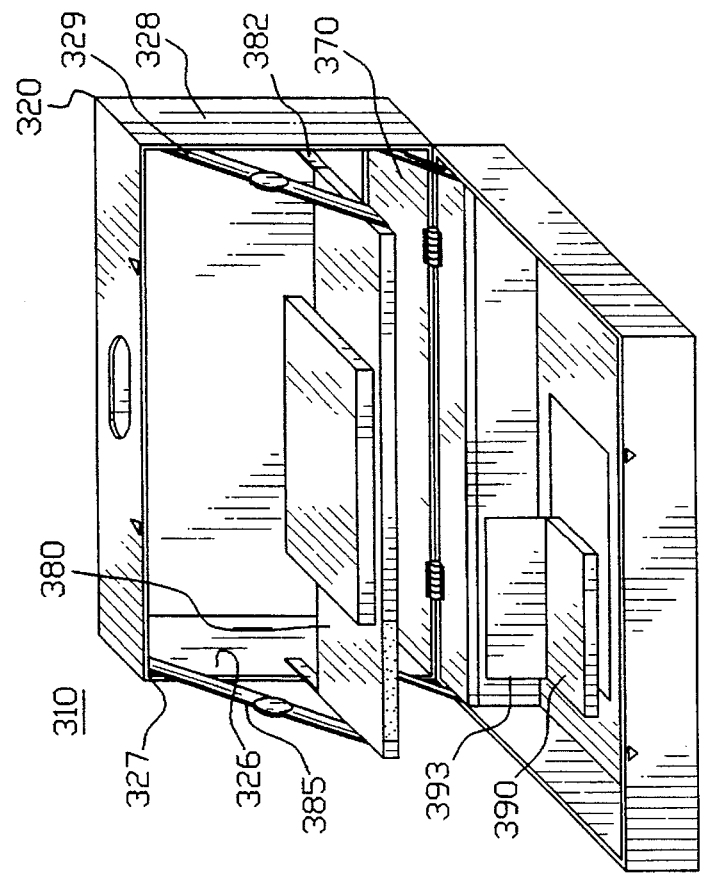
FIG. 4 shows an embodiment with an alternative connecting mechanism for the foldable staging area.

Referring to FIG. 4, an alternative method of attaching foldable staging area is shown. This embodiment is generally depicted as 310. All identical features shall have identical reference numbers.

Foldable staging area 380 is attached solely to top-box type structure 320. In addition to top connectors 382, hinge-type connectors 385 are provided. Hinge-type connectors 385 allow foldable staging area 380 to drop down from its resting position in top box-type structure 320 to its operating position just above screen 393 of laptop computer 390. Hinge-type connectors 385 are diagonally connected to an upper section of sides 326, 328, specifically at corner positions 327, 329 respectively. It should be noted that although electrical connection section 370 is depicted as being in top box-type structure 320, it can be placed as shown in previous embodiments.

Although the foldable staging area is generally shown as being used for a printer, it can be used for other peripheral devices, such as another laptop, or an external CD-ROM drive.

Figure 5:
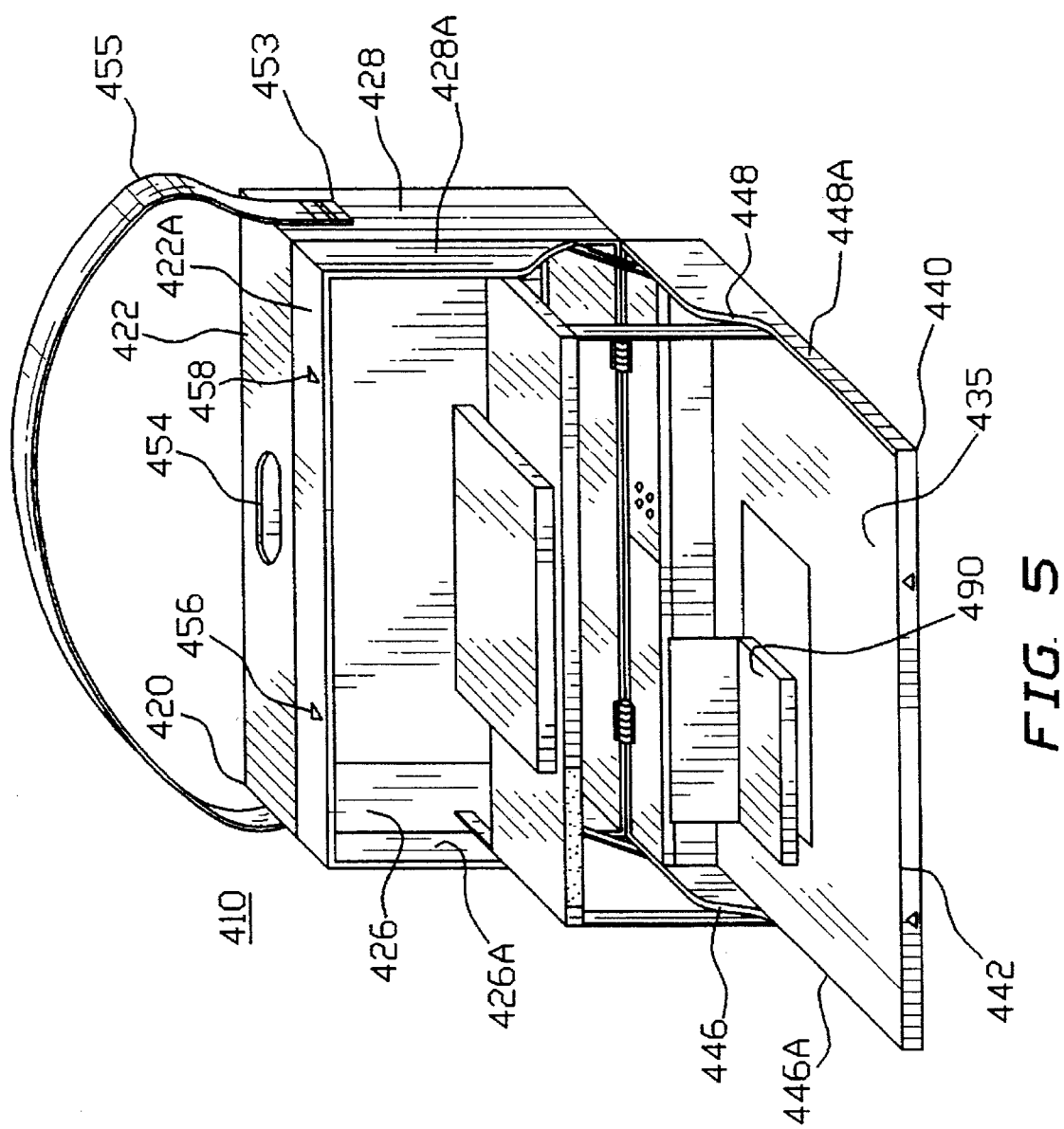
FIG. 5 shows an alternative embodiment of the present invention.

Referring to FIG. 5, an alternative embodiment for providing easy access to the laptop is described and is generally depicted as 410. Features which are different from previous embodiments are emphasized. All other features are as described previously.

Device 410 has a top box-type structure 420 and a bottom box-type structure 440. Top box-type structure 420 has top-sides 426, 428 which have partial side extensions 426a, 428a and top-front 422 which has an extended lip portion 422a. Although handle 454 is still situated on top-front 422, clasps 456, 458 are now located on extended lip portion 422a. An adjustable shoulder strap 455 is also provided on top-sides 426, 428 at strap fasteners 451, 453 to allow the user to carry the briefcase in a more easy manner.

Bottom box-type structure 440 has a complementary structure, i.e. sides 446, 448 have cutaway portions 446a and 448a which have heights to match partial side extensions 426a, 428a. In addition, front 442 has a height equal to cutaway portions 446a, 448a and complements extended lip portion 422a. In a closed state, device 410 resembles all other embodiments since all heights are constructed to be equivalent. Bottom 435 is constructed such that laptop 490 is at the same height as front 442. This allows for easy access to laptop 490.

Obviously, numerous modifications and variations of the present invention are possible in light of the above teachings. It is therefore understood that within the scope of the appended claims, the invention may be practiced otherwise than as specifically described herein.

What is claimed is:

1. An encasement device for a portable computer and other associated peripheral devices, comprising:

a) a top box-type structure having a first front, a first back, a cover, a first pair of side walls and a handle attached to said first front;

b) a bottom box-type structure having a second front, a second back, a bottom and second pair of side walls;

c) means for hingeably connecting said top box-type structure to said bottom box-type structure and means for securing said top box-type structure to said bottom box-type structure;

d) means for providing easy access to the laptop;

e) means for removeably attaching the portable computer to said bottom;

f) a containment section having a lid for holding electrical components including connectors, an outlet cord, surge protectors and power conditioners;

g) means for positioning and placing said containment section within said encasement device;

h) a foldable staging area having second means for removeably attaching one of said other associated peripheral devices; and i) means for hingeably attaching and positioning said foldable staging area within said encasement device, such that when said encasement device is open and is ready to use, said foldable staging area has adequate clearance for said portable computer when it is itself opened and such that said foldable staging area can fit within said top box-type structure when said encasement device is closed.

2. An encasement device as claimed in claim 1, wherein:

a) said containment section includes a rubber seal to provide passage for said electrical components; and b) said containment section and said rubber seal span a full length of said encasement device.

3. An encasement device as claimed in claim 2, wherein said means for positioning and placing said containment section within said encasement device places it in a rear portion of said bottom box-type structure.

4. An encasement device as claimed in claim 3, wherein said means for providing easy access to the laptop further includes:

a) means for connecting said second front to said second pair of sidewalls, such that said second front drops and folds down to a horizontal plane; and b) said second front has a wrist pad.

5. An encasement device as claimed in claim 3, wherein said means for providing easy access to the laptop further includes:

a) said first front having an extended lip portion;

b) said first pair of side walls having an associated pair of partial side extenders;

c) said second pair of sidewalls having partial cutaways matching said pair of partial side extenders; and d) said second front having a height equal to said partial cutaways and complements said extended lip portion; wherein said first front and said second front and said first pair of sidewalls and said second pair of sidewalls form an even structure when said encasement device is in a closed state.

6. An encasement device as claimed in claim 5, wherein said foldable staging area further includes:

a) a shelf area; and b) padding, said padding placed underneath said shelf area and on an internal side of said first front to prevent damage to and better secure said portable computer and one of said other associated peripheral devices.

7. An encasement device as claimed in claim 6, wherein said one of said other associated peripheral devices is a printer.

8. An encasement device as claimed in claim 7, further including a pair of stabilizer bars removeably attached adjacent to said portable computer to prevent lateral movement.

9. An encasement device as claimed in claim 8, further including:

a) means for providing access ports and means for electrically connecting facsimile devices, modem devices, serial port devices and parallel port devices to said portable computer; and b) means for having a detachable sub-shelf underneath which lie said means for electrically connecting.

10. An encasement device as claimed in claim 5, wherein said means for removeably attaching further includes:

a) a removable attachment mechanism centrally located on said bottom;

b) a complementary removable attachment mechanism attached by an user to an underneath of said portable computer; and c) means for placing said portable computer on said removable attachment mechanism centrally located on said bottom such that any side accessible, internal devices can be accessed without any difficultly.

11. An encasement device as claimed in claim 10, wherein said means for hingeably attaching and positioning said foldable staging area further includes:

a) first means for hingeably linking said foldable staging to said top box-type structure; and b) second means for hingeably linking said foldable staging area to said bottom box-type structure.

12. An encasement device as claimed in claim 11, wherein said means for hingeably attaching and positioning said foldable staging area further includes:

a) first means for hingeably linking said foldable staging area to said top box-type structure; and b) second means for hingeably linking said foldable staging area to said top box-type structure.

13. An encasement device as claimed in claim 2, wherein said means for positioning and placing said containment section within said encasement device places it in a bottom portion of said top box-type structure.

14. An encasement device as claimed in claim 13, wherein said means for positioning and placing places a second containment section in a rear portion of said bottom box-type structure.

15. An encasement device as claimed in claim 14, wherein said containment section, said second containment section and said rubber seal span a full length of said encasement device.

16. An encasement device as claimed in claim 15, wherein half of said containment section and said second containment section is used as an utility storage area.

17. An encasement device for a portable computer and other associated peripheral devices, comprising:

a) a top box-type structure having a first front, a first back, a cover, a first pair of side walls and a handle for carrying attached to said first front;

b) a bottom box-type structure having a second front, a second back, a bottom and second pair of side walls;

c) means for hingeably connecting and securing said top box-type structure to said bottom box-type structure;

d) means for providing easy access to a keyboard of said portable computer;

e) means for removeably attaching the portable computer to said bottom;

f) means for storing and accessing electrical components including connectors, an outlet cord, surge protectors and power conditioners;

g) means for positioning and placing said means for storing and accessing within said encasement device;

h) a foldable staging area having means for removeably attaching one of said other associated peripheral devices; and i) means for hingeably attaching and positioning said foldable staging area within said encasement device, such that when said encasement device is open, said foldable staging area has adequate clearance for said portable computer when it is itself opened and such that said foldable staging area can fit within said top box-type structure when said encasement device is closed.

18. An encasement device as claimed in claim 17, wherein said means for hingeably attaching and positioning said foldable staging area further includes a first means for linking to a first pair of sidewalls and a second means for linking to a second pair of side walls.

19. The encasement device claimed in claim 18, wherein said top box-type structure further includes an accordion type folder positioned on an internal side of said cover.

20. The encasement device claimed in claim 17, wherein said top box-type structure further includes an adjustable shoulder strap.

* * * * *